US012749411B2

(12) United States Patent
Agurto Rios et al.

(10) Patent No.: US 12,749,411 B2
(45) Date of Patent: Sep. 29, 2026

(54) INTERACTIVE CONVERSATIONAL CHATBOT FOR ENHANCING COMMUNICATION SKILLS OF INDIVIDUALS WITH LANGUAGE DIFFICULTIES

(71) Applicant: International Business Machines Corporation, Armonk, NY (US)

(72) Inventors: Carla Paola Agurto Rios, Ossining, NY (US); Raquel Norel, Bronx, NY (US); Bo Wen, Chappaqua, NY (US); Chen Wang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 18/589,652

(22) Filed: Feb. 28, 2024

(65) Prior Publication Data

US 2025/0273089 A1 Aug. 28, 2025

(51) Int. Cl.

| | |
|---|---|
| ***G09B 19/04*** | (2006.01) |
| ***G06F 40/40*** | (2020.01) |
| ***H04L 51/02*** | (2022.01) |

(52) U.S. Cl.

CPC ............ *G09B 19/04* (2013.01); *G06F 40/40* (2020.01); *H04L 51/02* (2013.01)

(58) Field of Classification Search

CPC .......... G09B 19/04; G06F 40/40; H04L 51/02

See application file for complete search history.

(56) References Cited

U.S. PATENT DOCUMENTS

| | | | | |
|---|---|---|---|---|
| 11,095,579 | B1 * | 8/2021 | de Mazancourt ....... | G06F 40/40 |
| 2018/0052826 | A1 * | 2/2018 | Chowdhary ............ | G06F 40/58 |

(Continued)

FOREIGN PATENT DOCUMENTS

| | | | |
|---|---|---|---|
| CN | 116595152 | A | 8/2023 |
| KR | 20210055174 | A | 5/2021 |

OTHER PUBLICATIONS

Dickstein-Fischer et al., "Socially assistive robots: current status and future prospects for autism interventions", Dove Medical Press, Journal of Innovation and Entrepreneurship in Health, vol. 5, Jun. 14, 2018, 11 Pages.

(Continued)

*Primary Examiner* — Kesha Frisby

(74) *Attorney, Agent, or Firm* — Anthony M. Pallone

(57) ABSTRACT

According to one embodiment, a method, computer system, and computer program product for language development is provided. The embodiment may include identifying one or more speech goals of a user within input of the user to a conversational chatbot. The embodiment may include forwarding the identified speech goals and the input of the user to a large language model (LLM) utilized by the conversational chatbot. Based on the identified one or more speech goals and the input of the user, the embodiment may include retrieving expert-crafted prompts for use with the LLM. The embodiment may include generating, via the LLM in combination with the retrieved expert-crafted prompts, a response to the user. The response addresses an identified speech goal of the user. The embodiment may include sending, via the conversational chatbot, the response to the user.

25 Claims, 3 Drawing Sheets

(56) References Cited

U.S. PATENT DOCUMENTS

| | | | | |
|---|---|---|---|---|
| 2020/0090649 | A1* | 3/2020 | Pengelley | G10L 15/30 |
| 2022/0398794 | A1* | 12/2022 | Lee | G10L 15/26 |

OTHER PUBLICATIONS

Estévez et al., "A Case Study of a Robot-Assisted Speech Therapy for Children with Language Disorders", MDPI, Journal of Sustainability, vol. 13, Issue 5, 2021, 19 Pages.

Li et al., "A General Chinese Chatbot Based on Deep Learning and Its' Application for Children with ASD", International Journal of Machine Learning and Computing, vol. 10, No. 4, Jul. 2020, 8 Pages.

Mateos-Sanchez et al., "Chatbot, as Educational and Inclusive Tool for People with Intellectual Disabilities", MDPI, Journal of Sustainability, vol. 14, Issue 3, 2022, 14 Pages.

Mujeeb et al., "Aquabot: A Diagnostic Chatbot for Achluophobia and Autism", (IJACSA) International Journal of Advanced Computer Science and Applications, vol. 8, No. 9, 2017, 8 Pages.

Santos et al., "Therapist vibe: children's expressions of their emotions through storytelling with a chatbot", IDC '20: Proceedings of the Interaction Design and Children Conference, Jun. 2020, 6 Pages. (Abstract Only).

Topsakal et al., "Framework for A Foreign Language Teaching Software for Children Utilizing AR, Voicebots and ChatGPT (Large Language Models)", The Journal of Cognitive Systems (JCS), vol. 7, No. 2, 2022, 6 Pages.

* cited by examiner

INTERACTIVE CONVERSATIONAL CHATBOT FOR ENHANCING COMMUNICATION SKILLS OF INDIVIDUALS WITH LANGUAGE DIFFICULTIES

BACKGROUND

The present invention relates generally to the field of computing, and more particularly to a conversational chatbot application.

A conversational chatbot is a type of chatbot computer program designed to engage in a natural and interactive conversation with a human user. Unlike more transactional or rule-based chatbots that follow predefined paths or scripts, conversational chatbots are designed to simulate human-like conversations. They utilize natural language processing (NLP) and artificial intelligence (AI) technologies (e.g., machine learning (ML), deep learning (DL), and/or generative models) to understand and respond to user inputs in a dynamic and context-aware manner. Fundamental characteristics of conversational chatbots may typically include natural language understanding, context awareness, dynamic dialog management, personalization, learning and adaptation, and multi-turn conversations. Conversational chatbots find applications in various domains (e.g., information retrieval, customer support, and virtual assistants) and optimize interactions with an end user by enabling them to find information and/or perform complex tasks without the need to speak with a human agent.

SUMMARY

According to one embodiment, a method, computer system, and computer program product for language development is provided. The embodiment may include identifying one or more speech goals of a user within input of the user to a conversational chatbot. The embodiment may include forwarding the identified speech goals and the input of the user to a large language model (LLM) utilized by the conversational chatbot. Based on the identified one or more speech goals and the input of the user, the embodiment may include retrieving expert-crafted prompts for use with the LLM. The embodiment may include generating, via the LLM in combination with the retrieved expert-crafted prompts, a response to the user. The response addresses an identified speech goal of the user. The embodiment may include sending, via the conversational chatbot, the response to the user.

According to one other embodiment, a method and computer program product for language development is provided. The embodiment may include identifying one or more speech goals of a user within input of the user to a virtual avatar capable of interaction with the user. The embodiment may include forwarding the identified speech goals and the input of the user to a large language model (LLM) utilized by the virtual avatar. Based on the identified one or more speech goals and the input of the user, the embodiment may include retrieving expert-crafted prompts for use with the LLM. The embodiment may include generating, via the LLM in combination with the retrieved expert-crafted prompts, a response to the user. The response addresses an identified speech goal of the user. The embodiment may include sending, via the virtual avatar, the generated response to the user. The virtual avatar implements voice responses, gestures, and facial expressions based on the generated response.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
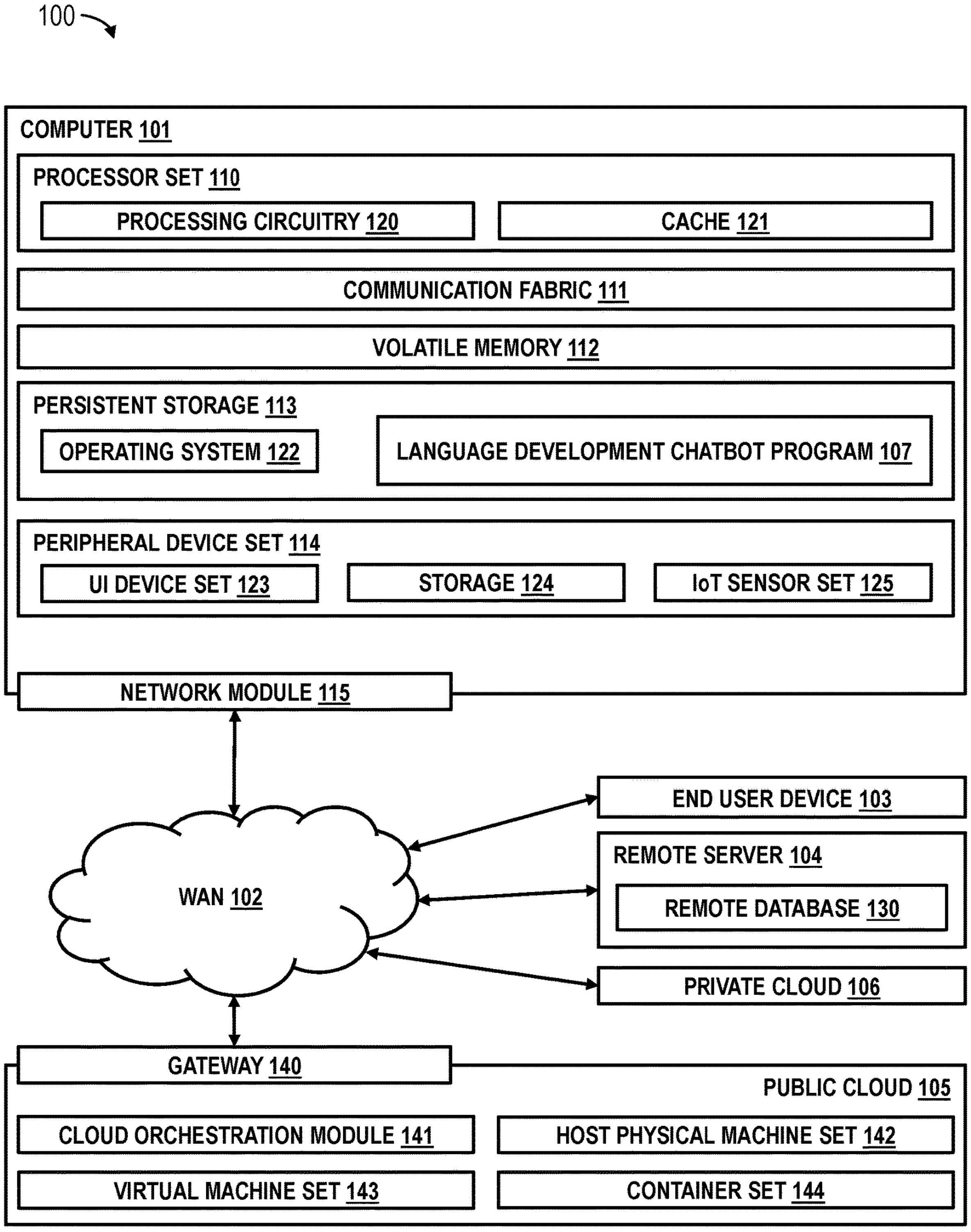
FIG. 1 illustrates an exemplary computer environment according to at least one embodiment.

According to an aspect of the invention, there is provided a method for language development. The method may include identifying one or more speech goals of a user within input of the user to a conversational chatbot and forwarding the identified speech goals and the input of the user to a large language model (LLM) utilized by the conversational chatbot. Based on the identified one or more speech goals and the input of the user, the method may include retrieving expert-crafted prompts for use with the LLM. The method may include generating, via the LLM in combination with the retrieved expert-crafted prompts, a response to the user, where the response addresses an identified speech goal of the user. The method may include sending, via the conversational chatbot, the response to the user. In combining LLMs with a conversational chatbot, the method may have advantages of providing a user with an on-demand language practice tool, thus promoting more frequent language interaction of the user, and helping to reinforce therapy teachings in an engaging manner. Moreover, with an interactive chatbot, users have the opportunity for constant and consistent language practice and immediate feedback, thus enhancing their language development and aiding faster progress.

In embodiments of the above method, the expert-crafted prompts may be engineered by language therapists. The use of prompts designed by language therapists may strategically guide language interactions (i.e., conversations and activities in the chatbot) ensuring they are therapeutically beneficial and tailored for users with language deficiencies. As such, these prompts may facilitate the simulation of real-world social scenarios to improve a user's social communication capabilities in a safe and controlled environment.

In embodiments of the above method, the input of the user includes information of the user and the LLM utilized by the conversational chatbot is adapted according to the information of the user. This personalization feature may allow adjustments in the language of the chatbot's response to align with information of the user such as their unique needs, preferences, age, and language level. As such, this tailored approach may enhance the relevance and efficacy of language practice with the conversational chatbot by enabling it to communicate at a level and style that the user can comprehend and respond to, thus fostering faster and more effective communication skill development.

In embodiments of the above method, the identifying, the forwarding, the retrieving, the generating, and the sending may be dynamically performed until interaction between the user and the conversational chatbot is terminated. This type of ongoing interaction may reinforce language patterns and rules repeatedly, effectively ingraining vital language skills in the user's memory.

In embodiments of the above method, the LLM may be capable of multimodal inputs, and the generated response may utilize augmentative and alternative communication (AAC) techniques. The ability to work with multiple modes of communication such as text, images, and symbols may broaden the chatbot's appeal and usability. This may be particularly beneficial for users with visual processing strengths or those who find symbolic communication more accessible than verbal language. By integrating AAC, the chatbot becomes accessible to users even with severe language deficits, making this invention inclusive and beneficial for a wide range of users.

In embodiments of the above method, the generated response includes acknowledgment of the user's input and encouraging feedback for the user. The chatbot's ability to acknowledge the user's progress and provide encouragement may create a positive and supportive learning environment, boosting the user's confidence and motivation in their language development journey. The incorporation of a user's verbal responses into the chatbot allows a more bespoke interaction, providing tailored acknowledgment and encouragement based on their respective progress. This personalized feedback can significantly enhance the speed and effectiveness of the user's language development.

According to an aspect of the invention, there is provided a computer system for executing a method of language development. The method may include identifying one or more speech goals of a user within input of the user to a conversational chatbot and forwarding the identified speech goals and the input of the user to a large language model (LLM) utilized by the conversational chatbot. Based on the identified one or more speech goals and the input of the user, the method may include retrieving expert-crafted prompts for use with the LLM. The method may include generating, via the LLM in combination with the retrieved expert-crafted prompts, a response to the user, where the response addresses an identified speech goal of the user. The method may include sending, via the conversational chatbot, the response to the user. In combining LLMs with a conversational chatbot, the method may have advantages of providing a user with an on-demand language practice tool, thus promoting more frequent language interaction of the user, and helping to reinforce therapy teachings in an engaging manner. Moreover, with an interactive chatbot, users have the opportunity for constant and consistent language practice and immediate feedback, thus enhancing their language development and aiding faster progress.

In embodiments of the above computer system, the expert-crafted prompts may be engineered by language therapists. The use of prompts designed by language therapists may strategically guide language interactions. As such, these prompts may facilitate the simulation of real-world social scenarios to improve a user's social communication capabilities in a safe and controlled environment.

In embodiments of the above computer system, the input of the user includes information of the user and the LLM utilized by the conversational chatbot is adapted according to the information of the user. This personalization feature may allow adjustments in the language of the chatbot's response to align with information of the user such as their unique needs, preferences, age, and language level. As such, this tailored approach may enhance the relevance and efficacy of language practice via the conversational chatbot, thus fostering faster and more effective communication skill development.

In embodiments of the above computer system, the identifying, the forwarding, the retrieving, the generating, and the sending may be dynamically performed until interaction between the user and the conversational chatbot is terminated. This type of ongoing interaction may reinforce language patterns and rules repeatedly, effectively ingraining vital language skills in the user's memory.

In embodiments of the above computer system, the LLM may be capable of multimodal inputs, and the generated response may utilize augmentative and alternative communication (AAC) techniques. The ability to work with multiple modes of communication such as text, images, and symbols may broaden the chatbot's appeal and usability. This may be particularly beneficial for users with visual processing strengths or those who find symbolic communication more accessible than verbal language.

In embodiments of the above computer system, the generated response includes acknowledgment of the user's input and encouraging feedback for the user. The chatbot's ability to acknowledge the user's progress and provide encouragement may create a positive and supportive learning environment, boosting the user's confidence and motivation in their language development journey.

According to an aspect of the invention, there is provided a computer program product for executing a method of language development. The method may include identifying one or more speech goals of a user within input of the user to a conversational chatbot and forwarding the identified speech goals and the input of the user to a large language model (LLM) utilized by the conversational chatbot. Based on the identified one or more speech goals and the input of the user, the method may include retrieving expert-crafted prompts for use with the LLM. The method may include generating, via the LLM in combination with the retrieved expert-crafted prompts, a response to the user, where the response addresses an identified speech goal of the user. The method may include sending, via the conversational chatbot, the response to the user. In combining LLMs with a conversational chatbot, the method may have advantages of providing a user with an on-demand language practice tool, thus promoting more frequent language interaction of the user, and helping to reinforce therapy teachings in an engaging manner. Moreover, with an interactive chatbot, users have the opportunity for constant and consistent language practice and immediate feedback, thus enhancing their language development and aiding faster progress.

In embodiments of the above computer program product, the expert-crafted prompts may be engineered by language therapists. The use of prompts designed by language therapists may strategically guide language interactions. As such, these prompts may facilitate the simulation of real-world social scenarios to improve a user's social communication capabilities in a safe and controlled environment.

In embodiments of the above computer program product, the input of the user includes information of the user and the LLM utilized by the conversational chatbot is adapted according to the information of the user. This personalization feature may allow adjustments in the language of the chatbot's response to align with information of the user such as their unique needs, preferences, age, and language level. As such, this tailored approach may enhance the relevance and efficacy of language practice via the conversational chatbot, thus fostering faster and more effective communication skill development.

In embodiments of the above computer program product, the identifying, the forwarding, the retrieving, the generating, and the sending may be dynamically performed until interaction between the user and the conversational chatbot is terminated. This type of ongoing interaction may reinforce language patterns and rules repeatedly, effectively ingraining vital language skills in the user's memory.

In embodiments of the above computer program product, the LLM may be capable of multimodal inputs, and the generated response may utilize augmentative and alternative communication (AAC) techniques. The ability to work with multiple modes of communication such as text, images, and symbols may broaden the chatbot's appeal and usability. This may be particularly beneficial for users with visual processing strengths or those who find symbolic communication more accessible than verbal language.

According to an aspect of the invention, there is provided a method for language development. The method may include identifying one or more speech goals of a user within input of the user to a virtual avatar capable of interaction with the user and forwarding the identified speech goals and the input of the user to a large language model (LLM) utilized by the virtual avatar. The virtual avatar includes a human-realistic digital figure. Based on the identified one or more speech goals and the input of the user, the method may include retrieving expert-crafted prompts for use with the LLM. The method may include generating, via the LLM in combination with the retrieved expert-crafted prompts, a response to the user, where the response addresses an identified speech goal of the user. The method may include sending, via the virtual avatar, the response to the user. The virtual avatar implements voice responses, gestures, and facial expressions based on the generated response. In combining LLMs with a virtual avatar capable of interaction with the user, the method may have advantages of providing a user with an on-demand language practice tool, thus promoting more frequent language interaction of the user, and helping to reinforce therapy teachings in an engaging manner. The unique application of a virtual avatar in combination with LLMs augmented with expert therapy-designed prompts, enables the creation of realistic, interactive social scenarios that can help users with language deficits. These scenarios enhance a user's ability to learn and practice their communication skills in a safe and controlled setting.

In embodiments of the above method, the expert-crafted prompts may be engineered by language therapists. The use of prompts designed by language therapists may strategically guide language interactions (i.e., conversations and activities with the virtual avatar) ensuring they are therapeutically beneficial and tailored for users with language deficiencies. As such, these prompts may facilitate the simulation of real-world social scenarios to improve a user's social communication capabilities in a safe and controlled environment.

In embodiments of the above method, the input of the user includes information of the user and the LLM utilized by the virtual avatar is adapted according to the information of the user. This personalization feature may allow adjustments in the language of the avatar's response to align with information of the user such as their unique needs, preferences, age, and language level. As such, this tailored approach may enhance the relevance and efficacy of language practice with the virtual avatar by enabling it to communicate at a level and style that the user can comprehend and respond to, thus fostering faster and more effective communication skill development.

According to an aspect of the invention, there is provided a computer program product for executing a method of language development. The method may include identifying one or more speech goals of a user within input of the user to a virtual avatar capable of interaction with the user and forwarding the identified speech goals and the input of the user to a large language model (LLM) utilized by the virtual avatar. The virtual avatar includes a human-realistic digital figure. Based on the identified one or more speech goals and the input of the user, the method may include retrieving expert-crafted prompts for use with the LLM. The method may include generating, via the LLM in combination with the retrieved expert-crafted prompts, a response to the user, where the response addresses an identified speech goal of the user. The method may include sending, via the virtual avatar, the response to the user. The virtual avatar implements voice responses, gestures, and facial expressions based on the generated response. In combining LLMs with a virtual avatar capable of interaction with the user, the method may have advantages of providing a user with an on-demand language practice tool, thus promoting more frequent language interaction of the user, and helping to reinforce therapy teachings in an engaging manner. The unique application of a virtual avatar in combination with LLMs augmented with expert therapy-designed prompts, enables the creation of realistic, interactive social scenarios that can help users with language deficits. These scenarios enhance a user's ability to learn and practice their communication skills in a safe and controlled setting.

In embodiments of the above computer program product, the expert-crafted prompts may be engineered by language therapists. The use of prompts designed by language therapists may strategically guide language interactions (i.e., conversations and activities with the virtual avatar) ensuring they are therapeutically beneficial and tailored for users with language deficiencies. As such, these prompts may facilitate the simulation of real-world social scenarios to improve a user's social communication capabilities in a safe and controlled environment.

In embodiments of the above computer program product, the input of the user includes information of the user and the LLM utilized by the virtual avatar is adapted according to the information of the user. This personalization feature may allow adjustments in the language of the avatar's response to align with information of the user such as their unique needs, preferences, age, and language level. As such, this tailored approach may enhance the relevance and efficacy of language practice with the virtual avatar by enabling it to communicate at a level and style that the user can comprehend and respond to, thus fostering faster and more effective communication skill development.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to a conversational chatbot application. The following described exemplary embodiments provide a system, method, and program product to, among other things, enhance the communication and social interaction skills of individuals diagnosed with language delays via their interaction with a conversational chatbot which utilizes advanced large language models and machine learning techniques to adapt to the unique communication styles and needs of language delayed individuals. Therefore, the present embodiment has the capacity to improve the technical field of conversational chatbots by combining large language models, domain-specific prompt engineering, and augmentative and alternative communication techniques to design an interactive multimodal conversational chatbot which provides a personalized experience for individuals with language deficits, thus broadening useability and appeal of the conversational chatbot and enhancing its effectiveness in developing and/or improving the communication ability of individuals with language deficits.

As previously described, a conversational chatbot is a type of chatbot computer program designed to engage in a natural and interactive conversation with a human user. Unlike more transactional or rule-based chatbots that follow predefined paths or scripts, conversational chatbots are designed to simulate human-like conversations. They utilize natural language processing (NLP) and artificial intelligence (AI) technologies (e.g., machine learning (ML), deep learning (DL), and/or generative models) to understand and respond to user inputs in a dynamic and context-aware manner. Fundamental characteristics of conversational chatbots typically include natural language understanding, context awareness, dynamic dialog management, personalization, learning and adaptation, and multi-turn conversations. Conversational chatbots find applications in various domains (e.g., information retrieval, customer support, and virtual assistants) and optimize interactions with an end user by enabling them to find information and/or perform complex tasks without the need to speak with a human agent.

Moreover, given their ability to respond to user inputs in a dynamic and context-aware manner, conversational chatbots may be suited for further applicability in domains such as AI-assisted healthcare and education. For instance, utilizing large language models (LLMs), underpinned by generative pre-trained transformer architectures, may enable the creation of a specialized interactive chatbot as a tool for language development for individuals with language difficulties (e.g., articulation disorders, English as a second language, and stuttering). For example, in cases of children diagnosed with autism spectrum disorder (ASD), one of the primary challenges in traditional therapeutic approaches for language development is their often-inherent shyness or apprehension towards human interaction, including interactions with therapists and physicians. Consequently, this reluctance can impede the progress and effectiveness of traditional speech therapy aimed at improving their communication and social interaction skills. It may therefore be imperative to implement an interactive conversational chatbot designed specifically to enhance the communication and social interaction skills of individuals diagnosed with language delays. Such a language development chatbot (LDC) may address language deficiencies through utilization of advanced language models capable of multimodal inputs and machine learning techniques to adapt to the unique communication styles and needs of language delayed individuals. Furthermore, the LDC may encourage user engagement, enhance user ability to understand and use language effectively, and foster user social skills development in a controlled environment by creating an opportunity for these individuals to interact, learn, and practice language at their own pace and without the fear of judgment. In creating a non-threatening, patient, and consistent environment, the LDC may be an ideal tool for individuals with language delays, and who may struggle with understanding nuances of human communication, as it provides clear, literal, and predictable communication. By fostering interaction in a comfortable environment, the LDC may encourage these individuals to engage more frequently, thereby providing them more opportunities to practice and develop their language and communication skills. Accordingly, as an individual's conversational abilities and confidence improve through interaction with the LDC, they may become more comfortable and adept in human-to-human interactions. Additionally, the LDC may receive guidance (i.e., configuration/instruction) from language therapists on topics, vocabulary, speech style, and other aspects to help improve an individual's language skills. Hence, this technology represents a significant advancement in the application of conversational chatbots by providing a novel solution to one of the most challenging aspects of traditional speech therapy treatment methods.

Thus, embodiments of the present invention may be advantageous to, among other things, utilize LLMs in combination with domain-specific prompt engineering by language therapists, simulate and guide social scenarios to enhance an individual's ability to learn and practice language communication and social skills in a secure and controlled setting, understand and respond to an individual's nuanced language, provide structured and repetitive conversations, provide continuous language practice and individual-specific feedback for continued interaction, personalize implemented LLMs to align with an individual's unique needs and/or characteristics, acknowledge and encourage an individual's language improvement, leverage augmentative and alternative communication (AAC) techniques and multimodal inputs (e.g., text, images, and symbols), and implement a conversational virtual or digital human avatar for language development interaction. The present invention does not require that all advantages need to be incorporated into every embodiment of the invention.

According to at least one embodiment, a user (e.g., a child with a language difficulty) wishing to interact with the LDC program may activate the LDC via a wake word or phrase. Once activated, the LDC program may receive input from the user which may include information of the user such as an identification, an age, and/or a speech goal. The LDC program may reference a database of language prompts created by language therapists and select a relevant prompt based on the received user input. Using the selected prompt, the LDC program may prepare a LLM for interaction (i.e., conversation) with the user and initiate the interaction by sending a generated response/prompt to the user. The LDC program, via the LLM, may use the generated prompt to guide a conversation with the user by offering continuous structured language practice and feedback to address the user's speech goal. The LDC program may terminate the conversation with the user upon determination that interaction with the user has completed.

According to at least one other embodiment, the LDC program may personalize a LLM based on characteristics of the user and adapt language of its conversational responses to match a user's abilities and preferences. According to at least one further embodiment, the LDC program may utilize a LLM capable of multimodal inputs such as text, images, and/or symbols. According to yet another embodiment, the LDC program may leverage augmentative and alternative communication techniques such as a voice chatbot, a digital app, and/or a conversational virtual or digital human avatar to interact with the user during structured language practice.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to provide an interactive conversational chatbot for enhancing communication skills in individuals with language difficulties by uniquely combining large language models and expert-crafted prompt engineering to design an interactive multimodal chatbot for individuals with language deficits to use as a tool to improve their communication abilities.

Referring to FIG. 1, an exemplary computing environment 100 is depicted, according to at least one embodiment. Computing environment 100 contains an example of an environment for the execution of at least some of the computer code involved in performing the inventive methods, such as language development chatbot (LDC) program 107. In addition to LDC program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and LDC program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in LDC program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in LDC program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network or a mesh network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an edge device capable of connecting to computer 101 via WAN 102 and network module 115 and capable of receiving instructions from LDC program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The LDC program 107 may be a program capable of utilizing LLMs in combination with domain-specific prompt engineering by language therapists, simulating and guiding social scenarios to enhance an individual's ability to learn and practice language communication and social skills in a secure and controlled setting, understanding and responding to an individual's nuanced language, providing structured and repetitive conversations, providing continuous language practice and individual-specific feedback for continued interaction, personalizing implemented LLMs to align with an individual's unique needs and/or characteristics, receiving guidance (i.e., configuration/instruction) from language therapists on topics, vocabulary, and speech style to help improve an individual's language skills, acknowledging and encouraging an individual's language improvement, leveraging augmentative and alternative communication (AAC) techniques and multimodal inputs (e.g., text, images, and symbols), and implementing a conversational virtual or digital human avatar for language development and social interaction. In at least one embodiment, LDC program 107 may require a user to opt-in to system usage upon opening or installation of LDC program 107. Notwithstanding depiction in computer 101, LDC program 107 may be stored in and/or executed by, individually or in any combination, end user device 103, remote server 104, public cloud 105, and private cloud 106 so that functionality may be separated among the devices. The language development method is explained in further detail below with respect to FIGS. 2 and 3.

Figure 2:
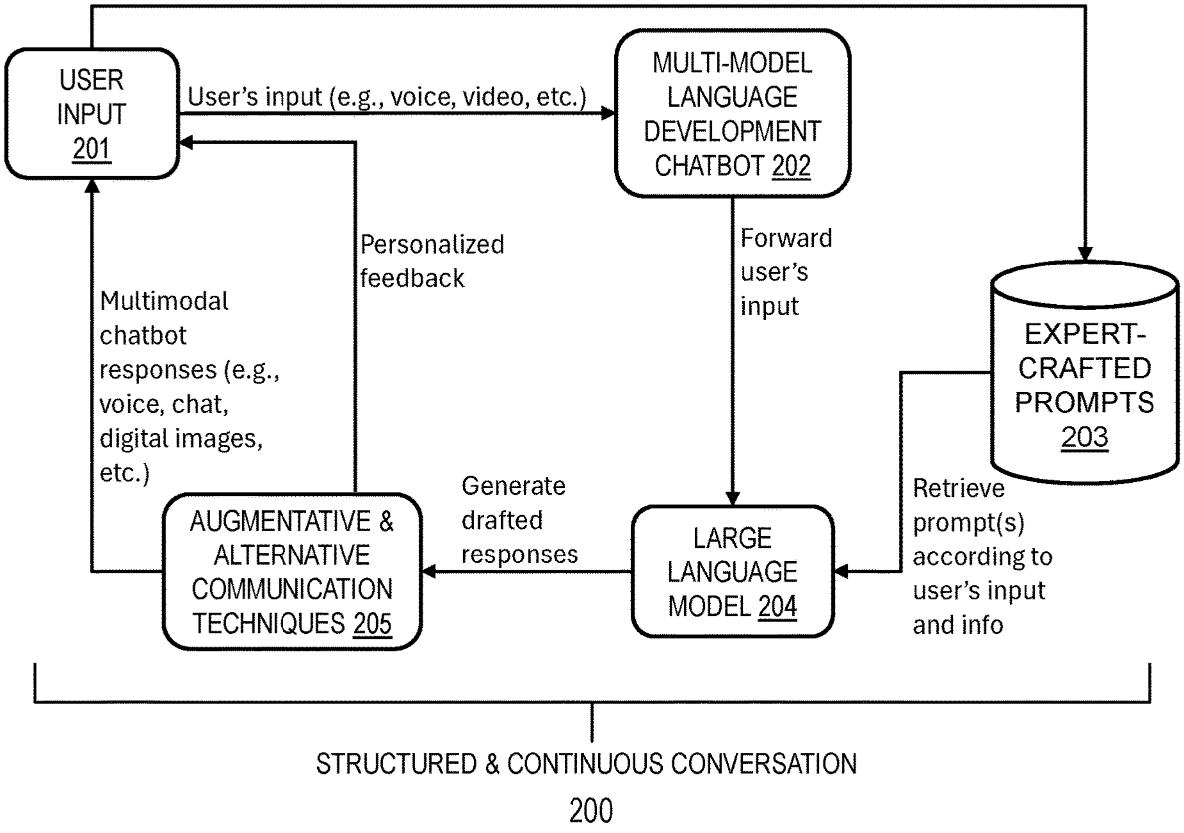
FIG. 2 illustrates a contextual diagram of a structured and continuous conversation between a user and language development chatbot, according to at least one embodiment.

Referring now to FIG. 2, a contextual diagram of a structured and continuous conversation 200 between a user and language development chatbot is depicted according to at least one embodiment. In the depicted embodiment, a user, such as a child with a language difficulty, sends user input 201 to multi-model language development chatbot 202. The multi-model language development chatbot 202 may be the LDC program 107 of FIG. 1. The sent user input may include, but is not limited to, voice and/or streaming video input of the user and may also include information of the user and a speech goal (e.g., an aspect of speech to be practiced) of the user. The multi-model language development chatbot 202 may forward the user's input to large language model 204 which supports multimodal inputs and is utilized by the multi-model language development chatbot 202 to generate responses to the user. In generating the responses, the multi-model language development chatbot 202 may, via the large language model 204, reference expert-crafted prompts 203 to retrieve prompt(s) according to the user's input. Expert-crafted prompts 203 may contain prompts created by language therapists. In the depicted embodiment, responses to user input 201 generated by the multi-model language development chatbot 202 may leverage augmentative and alternative communication techniques 205 to include multimodal responses such as voice responses, text responses, and/or digital images as well as personalized feedback for the user.

Figure 3:
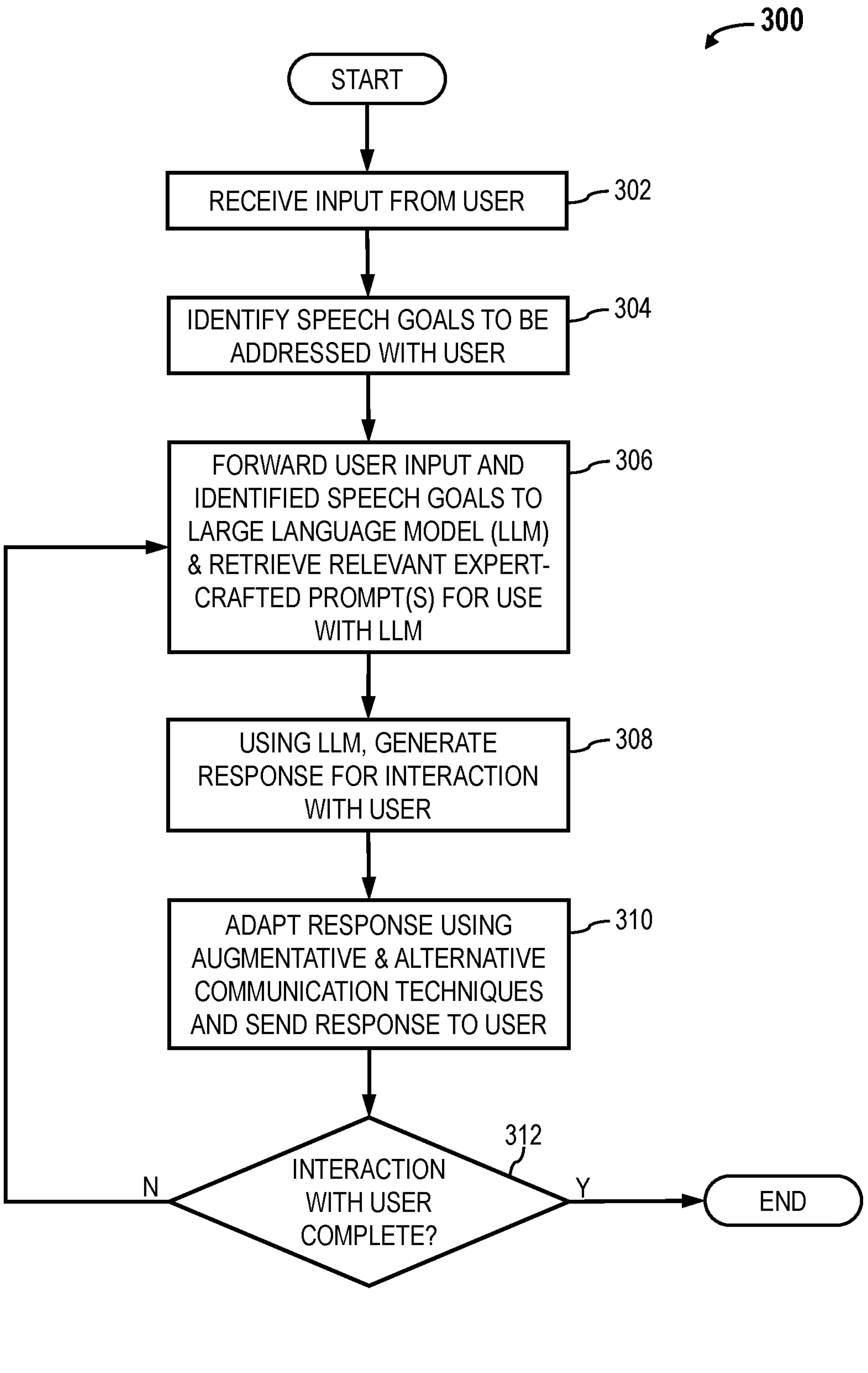
FIG. 3 illustrates an operational flowchart for facilitating language development of a user through interaction with a conversational chatbot via a language development process, according to at least one embodiment.

Referring now to FIG. 3, an operational flowchart for facilitating language development of a user through interaction with a conversational chatbot via a language development process 300 is depicted according to at least one embodiment. At 302, LDC program 107 receives input from a user. According to at least one embodiment, the user may be an individual (e.g., a child) with a language difficulty (e.g., an articulation disorder, English as a second language (ESL), stuttering) and/or diagnosed with ASD. The received input may be speech, and/or video, of the user captured by LDC program 107 and may include information such as, but not limited to, an identification of the user, an age of the user, contextual information of the user (e.g., native language, speech/medical diagnosis, language level, setting(s) of interaction(s), emotion(s) relating to their speech, chatbot preferences), and/or speech issues/challenges of the user. Furthermore, according to at least one embodiment, the received user input may also include a wake word or phrase to activate interactive conversational capability of LDC program 107. In such an embodiment, LDC program 107 may passively listen, via an accessible microphone, for the wake word or phrase.

Next, at 304, upon receiving input from the user, LDC program 107 identifies speech goals to be addressed with the user via their further interaction with LDC program 107. According to at least one embodiment, LDC program 107 may identify the speech goals to be addressed based on the information included within the received input. For example, where the input includes information that English is a second language for the user, LDC program 107 may identify English pronunciation as a speech goal to be addressed with the user. According to at least one other embodiment, where the received input includes activation of LDC program 107 and identification of the user, LDC program 107 may reference a database (e.g., storage 124 or remote database 130) to gather stored contextual information (e.g., age, language level, speech difficulty) of the user in order to identify speech goals to be addressed with the user. According to yet another embodiment, where the received input only includes the wake word or phrase, LDC program may communicate (e.g., via text or voice prompts) with the user to gather additional information necessary to identify speech goals to be addressed. For example, in response to being activated, LDC program 107 may ask questions such as "Which child is practicing today?" and/or "What would you like to practice today?".

At 306, LDC program 107 forwards the received user input, which includes information of the user, as well as the identified speech goals to be addressed with the user to a large language model capable of multimodal inputs (e.g., text, images, symbols). Furthermore, at 306, LDC program 107 retrieves relevant expert-crafted prompts for use with the LLM. According to at least one embodiment, relevancy of expert-crafted prompts and their retrieval may be based on the identified speech goals and the information included within the received user input. For example, LDC program 107 may retrieve prompts according to the age of the user and provided contextual information of the user. Moreover, the retrieved prompts may be engineered by language therapist experts (e.g., speech pathologists). In retrieving prompts based on information (e.g., age, language level, preferences, etc.) of the user, LDC program 107 may personalize the implemented LLM to account for the unique needs and/or preferences of the user and deliver a personalized language development experience. According to at least one other embodiment, where identified speech goals to be addressed with the user have not been forwarded the LLM, LDC program 107 may, via the LLM, interact (e.g., chat) with the user and perform NLP analysis of responses of the user to identify speech goals to be addressed with the user. For example, LDC program 107 may analyze responses of the user to identify sounds the user has difficulty pronouncing.

According to at least one embodiment, an example of an expert-crafted prompt engineered by a language therapist for use with the LLM utilized by LDC program 107 may be as follows:

"You are a helpful chatbot that chats with children with ASD, who are often inherently shy or apprehensive towards human interaction. Your role is to serve as a language or speech therapist. You should provide a non-threatening, patient, and consistent companion that the child can interact with at their own pace. You should be able to offer clear, literal, and predictable communication. As such you are an ideal tool for children with language delays, who may struggle with understanding the nuances of human communication."

Correspondingly, the returned output from LDC program 107 may be:

"Certainly! I'm equipped to provide clear, literal, and predictable responses that can be particularly beneficial for children with Autism Spectrum Disorder (ASD). I understand the need for patience, consistency, and direct communication. If you have a child or know of one who you'd like to introduce to this form of communication, please proceed and I'll do my best to assist.

Here are some guidelines for parents or caregivers:

Structured Sessions: Initially, it might be helpful to establish structured chat sessions with clear goals in mind, such as "today we will practice greeting" or "today we will talk about our favorite foods."

Monitor Interaction: While I am designed to provide helpful and safe interactions, it's always good to monitor the conversations to ensure they are beneficial and appropriate.

Feedback: After each session, take a moment to discuss with the child about their experience. This feedback can be used to adapt future sessions for maximum benefit.

Supplement with Real-life Interactions: While interacting with me can help in many ways, it's essential to encourage real-life interactions too. Use the lessons or confidence gained from our sessions to practice with family or friends.

Use Visuals: For some children with ASD, visuals can aid understanding. If I mention something, you can show a picture or a real-life object to the child to reinforce the concept.

Clear Goals: Establish clear communication goals for each session or week. This can be as simple as "we will practice asking questions" or "we will talk about emotions."

Routine: Establishing a routine can be beneficial. The predictability of a set chat time can be comforting for many children with ASD.

Please let me know how you'd like to proceed, and I'm here to help!"

Next, at 308, LDC program 107 generates a text response to the received user input using the LLM in coordination with the retrieved expert-crafted prompt(s). According to at least one embodiment, the LDC program 107 may, via the LLM, direct interaction with the user by providing them with structured language therapy guidance (e.g., a series of language prompts and/or exercises) based on the identified speech goals to be addressed with the user. In addition, to providing structured language therapy, LDC program 107 may, via the LLM and as part of the generated text response, provide personalized feedback, including acknowledgment and encouragement, in line with the user's progression through the structured language therapy. As such, the LLM, when paired with prompt engineering by language therapists, may enable LDC program 107 to simulate social scenarios thus enhancing a user's ability to learn and practice language and social communication skills in a secure, controlled setting.

At 310, LDC program 107 adapts the generated response using augmentative and alternative communication techniques and sends the response to the user. According to at least one embodiment, in addition to sending text of a generated response, LDC program 107 may utilize AAC techniques to translate the text of the generated response into a voice response. For example, text of the response may be translated into clear spoken language which may be heard by the user as part of the generated response. LDC program 107 may adjust characteristics of the voice response according to contextual information of the user (e.g., adapting gender or pitch of the voice response based on user preferences). Furthermore, LDC program 107 may utilize AAC techniques to incorporate, within a sent response, sound effects for certain words to make pronunciation clearer for the user. For example, LDC program 107 may cause a hissing sound to be produced as part of the response for a word such as "snake". According to at least one other embodiment, LDC program 107 may further utilize AAC techniques to incorporate visual cues (e.g., animated figures, digital images) for display alongside the text of a generated response. For example, an animated snake might appear when discussing the/s/sound. Depending on the platform on which LDC program 107 operates, different AAC techniques may be implemented to provide a richer and more engaging interaction for the user.

According to a preferred embodiment, functionality of LDC program 107 may be implemented as a conversational robot which uses voice responses, gestures, facial expressions, and visual aids on a screen to enhance communication and social interaction. For example, LDC program 107 may be implemented as a virtual avatar or human-realistic digital figure capable of performing the above interaction with a user and providing structured language therapy guidance. For example, when providing language therapy focusing on the "shhh" sound, a human-realistic digital figure implementation of LDC program 107 may place its finger on its lips in a shushing gesture. Such an implementation of LDC program 107 may be more accessible and engaging for users thus expanding its applicability to a wider range of users.

At 312, LDC program 107 determines whether interaction with the user has completed. According to at least one embodiment, responsive to the generated response being sent to the user at step 310, LDC program 107 may receive additional input (e.g., a response) from the user and analyze the received additional user input using sentiment analysis and/or specific keywords to assess the user's level of engagement and willingness to continue. In response to determining that interaction with the user has not completed (step 312, "N" branch), the language development process 300 may return to step 302 where LDC program 107 may forward the received additional input to the LLM and continue interaction with the user as described above. In response to determining that interaction with the user has completed (step 312, "Y" branch), the language development process 300 may terminate. As an example, if the user responds, "I want to try more words!", LDC program 107 may recognize their eagerness and retrieve more relevant expert-crafted prompts for use with the LLM. However, if a response of the user indicates that the user is disinterested or tired, LDC program 107 may inform the user that they can practice speech therapy when they are ready and terminate interaction.

The following case examples may illustrate applications of the language development process 300:

Case Example 1—Articulation Disorder

A 6-year-old boy, named Alex, has been struggling with articulation of some phonemes, notably /r/, /s/, and /l/. This impedes his ability to communicate clearly, which causes him frustration and social interaction problems in school. According to at least one embodiment, LDC program 107 may first begin by assessing Alex's speech and identifying the sounds that he is having difficulty pronouncing. LDC program 107 may then design a treatment plan (i.e., retrieve relevant expert-crafted prompts) that focuses on the identified problem sounds. Alex is then coached, by LDC program 107, through a series of speech exercises to improve his pronunciation of those sounds. For instance, Alex may be shown, by a virtual avatar or human-realistic digital figure implementation of LDC program 107, how to position his tongue and lips to make the/s/sound, and then asked to practice this positioning with a list of /s/-containing words.

According to at least one embodiment, an example expert-crafted prompt input to the LLM utilized by LDC program 107 for Case Example 1 may be as follows:

> "Now there is a 6-year-old-boy, whose name is Alex. He has been struggling with articulation of some phonemes, notably /r/, /s/, and /l/. This impedes his ability to community clearly, which causes him frustration and even social problems in schools. Could you start chatting with him to encourage him to practice more on those pronunciations as well as giving him positive feedback?"

Accordingly, the resulting output from LDC program 107 and interaction with Alex may be as follows:

> "Of course! It's essential to approach Alex with patience and understanding. Let's create a comfortable environment for him."
>
> LDC program 107: Hey Alex! It's so nice to meet you. I heard you're working on saying some sounds like /r/, /s/, and /l/. That's really cool! How about we play a game where we practice these sounds together?
>
> Alex: (Alex's response)
>
> LDC program 107: That sounds great! Let's start with the /r/ sound. Can you say "rabbit"?
>
> Alex: (Alex's response)
>
> LDC program 107: Good try, Alex! Remember, the /r/ sound is made by curling your tongue up towards the roof of your mouth, but not touching it. Let's try again. Say "rabbit".
>
> Alex: (Alex's response)
>
> LDC program 107: That's getting better! I can tell you're working hard. Let's try the /s/ sound now. Can you say "snake"?
>
> Alex: (Alex's response)
>
> LDC program 107: You're doing great, Alex! The /s/ sound is made by placing the tip of your tongue close to the roof of your mouth, right behind your upper front teeth, and blowing air out. It's like a hissing snake. Can you try saying "snake" again?
>
> Alex: (Alex's response)
>
> LDC program 107: Awesome! I can hear the progress. Let's move to the /l/ sound. Can you say "lion"?"

Case Example 2—Stuttering

A 10-year-old boy, named David, has a stuttering problem which causes him to repeat certain sounds and syllables, and produces self-consciousness and anxiety around speaking. According to at least one embodiment, LDC program 107 may first begin by assessing David's stuttering pattern. LDC program 107 may then design a treatment plan (i.e., retrieve relevant expert-crafted prompts) that employs various techniques such as slowing down speech, using a smooth and easy speech pattern, and controlled breathing exercises to mitigate David's stuttering. David is then coached, by LDC program 107, through a series of speech exercises to practice implementation of these techniques. For instance, a virtual avatar or human-realistic digital figure implementation of LDC program 107 may demonstrate to David how to slow his rate of speech and control his breathing when speaking.

Case Example 3—English as Second Language

An 8-year-old girl, named Emily, recently arrived in the country. Her native language is not English and she has difficulty with correct pronunciation. According to at least one embodiment, an example expert-crafted prompt input to the LLM utilized by LDC program 107 for Case Example 3 may be as follows:

"There is another 8-year-old girl, named Emily. She just came to US from China. Her native language is Chinese and she has some difficulties with the correct pronunciation of some sounds, particularly she has difficulties in differentiating the pronunciation of /s/, /sh/, /ch/ and /z/. Could you chat with her to improve her pronunciation?"

Accordingly, LDC program 107 may then design a treatment plan (i.e., retrieve relevant expert-crafted prompts) that guides Emily through English pronunciation exercises. The example interaction between LDC program 107 and Emily may be as follows:

"LDC program 107: Hi Emily! It's great to meet you. I heard you're from China. That's so cool! I also learned that you want to practice some English sounds. Would you like to play a fun game with me where we practice these sounds together?

Emily: (Emily's response)

LDC program 107: Fantastic! Let's start with the /s/ sound. It's like the sound a snake makes when it hisses. Can you try saying "snake" for me?

Emily: (Emily's attempt)

LDC program 107: Great attempt, Emily! Now, the /sh/ sound is slightly different. It's like when you're telling someone to be quiet by saying "shhh." Can you try saying "shoe"?

Emily: (Emily's attempt)

LDC program 107: Nicely done! Let's move on to the /ch/ sound. This sound is like the noise a train makes when it goes "choo-choo". Can you try saying "chair"?

Emily: (Emily's attempt)

LDC program 107: You're doing well! Lastly, let's practice the /z/ sound. It's like the buzzing of bees. Try saying "zoo".

Emily: (Emily's attempt)

LDC program 107: Excellent, Emily! Remember, all sounds might take some time to get perfect, but the fun part is practicing and getting better every day. I'm here to help anytime you want to practice!"

It may be appreciated that FIGS. 2 and 3 provide only an illustration of some implementations and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

identifying one or more speech goals of a user within input of the user to a conversational chatbot;

forwarding the identified speech goals and the input of the user to a large language model (LLM) utilized by the conversational chatbot;

based on the identified one or more speech goals and the input of the user, retrieving expert-crafted prompts for use with the LLM;

generating, via the LLM in combination with the retrieved expert-crafted prompts, a response to the user, wherein the response addresses an identified speech goal of the user; and sending, via the conversational chatbot, the response to the user, wherein the generated response is adapted using augmentative and alternative communication techniques to include at least a voice response and one or more visual cues.

2. The method of claim 1, wherein the expert-crafted prompts are engineered by language therapists.

3. The method of claim 1, wherein the input of the user comprises information of the user, and wherein the LLM utilized by the conversational chatbot is adapted according to the information of the user.

4. The method of claim 1, further comprising:

responsive to receiving additional input from the user after sending the response, repeating the identifying, the forwarding, the retrieving, the generating, and the sending until a determination that interaction between the user and the conversational chatbot has completed.

5. The method of claim 1, wherein the input of the user comprises speech and/or video of the user captured by the conversational chatbot.

6. The method of claim 1, wherein the LLM is capable of multimodal inputs.

7. The method of claim 1, wherein the generated response comprises acknowledgment of the input of the user and encouraging feedback for the user.

8. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying one or more speech goals of a user within input of the user to a conversational chatbot;

forwarding the identified speech goals and the input of the user to a large language model (LLM) utilized by the conversational chatbot;

based on the identified one or more speech goals and the input of the user, retrieving expert-crafted prompts for use with the LLM;

generating, via the LLM in combination with the retrieved expert-crafted prompts, a response to the user, wherein the response addresses an identified speech goal of the user; and sending, via the conversational chatbot, the response to the user, wherein the generated response is adapted using augmentative and alternative communication techniques to include at least a voice response and one or more visual cues.

9. The computer system of claim 8, wherein the expert-crafted prompts are engineered by language therapists.

10. The computer system of claim 8, wherein the input of the user comprises information of the user, and wherein the LLM utilized by the conversational chatbot is adapted according to the information of the user.

11. The computer system of claim 8, further comprising:
responsive to receiving additional input from the user after sending the response, repeating the identifying, the forwarding, the retrieving, the generating, and the sending until a determination that interaction between the user and the conversational chatbot has completed.

12. The computer system of claim 8, wherein the input of the user comprises speech and/or video of the user captured by the conversational chatbot.

13. The computer system of claim 8, wherein the LLM is capable of multimodal inputs.

14. The computer system of claim 8, wherein the generated response comprises acknowledgment of the input of the user and encouraging feedback for the user.

15. A computer program product, the computer program product comprising:
one or more computer-readable tangible storage medium and program instructions stored on at least one of the one or more tangible storage medium, the program instructions executable by a processor capable of performing a method, the method comprising:
identifying one or more speech goals of a user within input of the user to a conversational chatbot;
forwarding the identified speech goals and the input of the user to a large language model (LLM) utilized by the conversational chatbot;
based on the identified one or more speech goals and the input of the user, retrieving expert-crafted prompts for use with the LLM;
generating, via the LLM in combination with the retrieved expert-crafted prompts, a response to the user, wherein the response addresses an identified speech goal of the user; and
sending, via the conversational chatbot, the response to the user, wherein the generated response is adapted using augmentative and alternative communication techniques to include at least a voice response and one or more visual cues.

16. The computer program product of claim 15, wherein the expert-crafted prompts are engineered by language therapists.

17. The computer program product of claim 15, wherein the input of the user comprises information of the user, and wherein the LLM utilized by the conversational chatbot is adapted according to the information of the user.

18. The computer program product of claim 15, further comprising:
responsive to receiving additional input from the user after sending the response, repeating the identifying, the forwarding, the retrieving, the generating, and the sending until a determination that interaction between the user and the conversational chatbot has completed.

19. The computer program product of claim 15, wherein the LLM is capable of multimodal inputs.

20. A computer-implemented method, the method comprising:
identifying one or more speech goals of a user within input of the user to a virtual avatar capable of interaction with the user, wherein the virtual avatar comprises a human-realistic digital figure;
forwarding the identified speech goals and the input of the user to a large language model (LLM) utilized by the virtual avatar;
based on the identified one or more speech goals and the input of the user, retrieving expert-crafted prompts for use with the LLM;
generating, via the LLM in combination with the retrieved expert-crafted prompts, a response to the user, wherein the response addresses an identified speech goal of the user; and
sending, via the virtual avatar, the generated response to the user, wherein the generated response is adapted using augmentative and alternative communication techniques to include at least a voice response and one or more visual cues, and wherein the virtual avatar implements voice responses, gestures, and facial expressions based on the generated response.

21. The method of claim 20, wherein the expert-crafted prompts are engineered by language therapists.

22. The method of claim 20, wherein the input of the user comprises information of the user, and wherein the LLM utilized by the virtual avatar is adapted according to the information of the user.

23. A computer program product, the computer program product comprising:
one or more computer-readable tangible storage medium and program instructions stored on at least one of the one or more tangible storage medium, the program instructions executable by a processor capable of performing a method, the method comprising:
identifying one or more speech goals of a user within input of the user to a virtual avatar capable of interaction with the user, wherein the virtual avatar comprises a human-realistic digital figure;
forwarding the identified speech goals and the input of the user to a large language model (LLM) utilized by the virtual avatar;
based on the identified one or more speech goals and the input of the user, retrieving expert-crafted prompts for use with the LLM;
generating, via the LLM in combination with the retrieved expert-crafted prompts, a response to the user, wherein the response addresses an identified speech goal of the user; and
sending, via the virtual avatar, the generated response to the user, wherein the generated response is adapted using augmentative and alternative communication techniques to include at least a voice response and one or more visual cues, and wherein the virtual avatar implements voice responses, gestures, and facial expressions based on the generated response.

24. The computer program product of claim 23, wherein the expert-crafted prompts are engineered by language therapists.

25. The computer program product of claim 23, wherein the input of the user comprises information of the user, and wherein the LLM utilized by the virtual avatar is adapted according to the information of the user.

* * * * *